(12) United States Patent
Lindenman et al.

(10) Patent No.: US 6,398,249 B1
(45) Date of Patent: *Jun. 4, 2002

(54) TILTING FIFTH WHEEL TRAILER HITCH

(76) Inventors: Thomas W. Lindenman, 18487 Kern Rd., South Bend, IN (US) 48614; Rick McCoy, 51559 Deerpath Dr., Granger, IN (US) 46530

(*) Notice: Subject to any disclaimer, the term of this patent is extended or adjusted under 35 U.S.C. 154(b) by 0 days.

This patent is subject to a terminal disclaimer.

(21) Appl. No.: 09/724,005

(22) Filed: Nov. 28, 2000

Related U.S. Application Data

(63) Continuation of application No. 09/213,136, filed on Dec. 18, 1998, now Pat. No. 6,170,851.
(60) Provisional application No. 60/068,337, filed on Dec. 19, 1997, now abandoned.

(51) Int. Cl.[7] .............................................. B62D 53/12
(52) U.S. Cl. ..................................... 280/434; 280/438.1
(58) Field of Search ................................. 280/433, 434, 280/437, 438.1, 492, 901, 423.1, 439

(56) References Cited

U.S. PATENT DOCUMENTS

| | | | | |
|---|---|---|---|---|
| 2,925,286 A | * | 2/1960 | Hodges, Jr. et al. | |
| 5,120,080 A | * | 6/1992 | Ritter | 280/433 |
| 5,257,796 A | * | 11/1993 | Thorwall et al. | 280/434 |
| 5,516,137 A | * | 5/1996 | Kass et al. | 280/434 |
| 5,529,329 A | * | 6/1996 | McCoy | 280/438.1 |
| 5,707,070 A | * | 1/1998 | Lindenman et al. | 280/438.1 |
| 5,839,745 A | * | 11/1998 | Cattau et al. | 280/434 |

* cited by examiner

*Primary Examiner*—Brian L. Johnson
*Assistant Examiner*—Avraham H. Lerner

(57) ABSTRACT

A fifth wheel hitch (10) has a skid plate (28) pivotally mounted to a housing (18) for lateral pivotable movement. The hitch is closed with a sliding jaw plate and has a lock block (54) that optionally can affix the skid plate to the housing during towing of a trailer. Both the jaw plate (36) and lock block (54) are operated and set by a handle (20) that extends out of the side of the housing. The handle has a crank (21) that can both be rotated and pulled by the operator from the side of a pickup truck for convenience in operation to control both opening and closing the hitch and selectively setting the lock block.

9 Claims, 6 Drawing Sheets

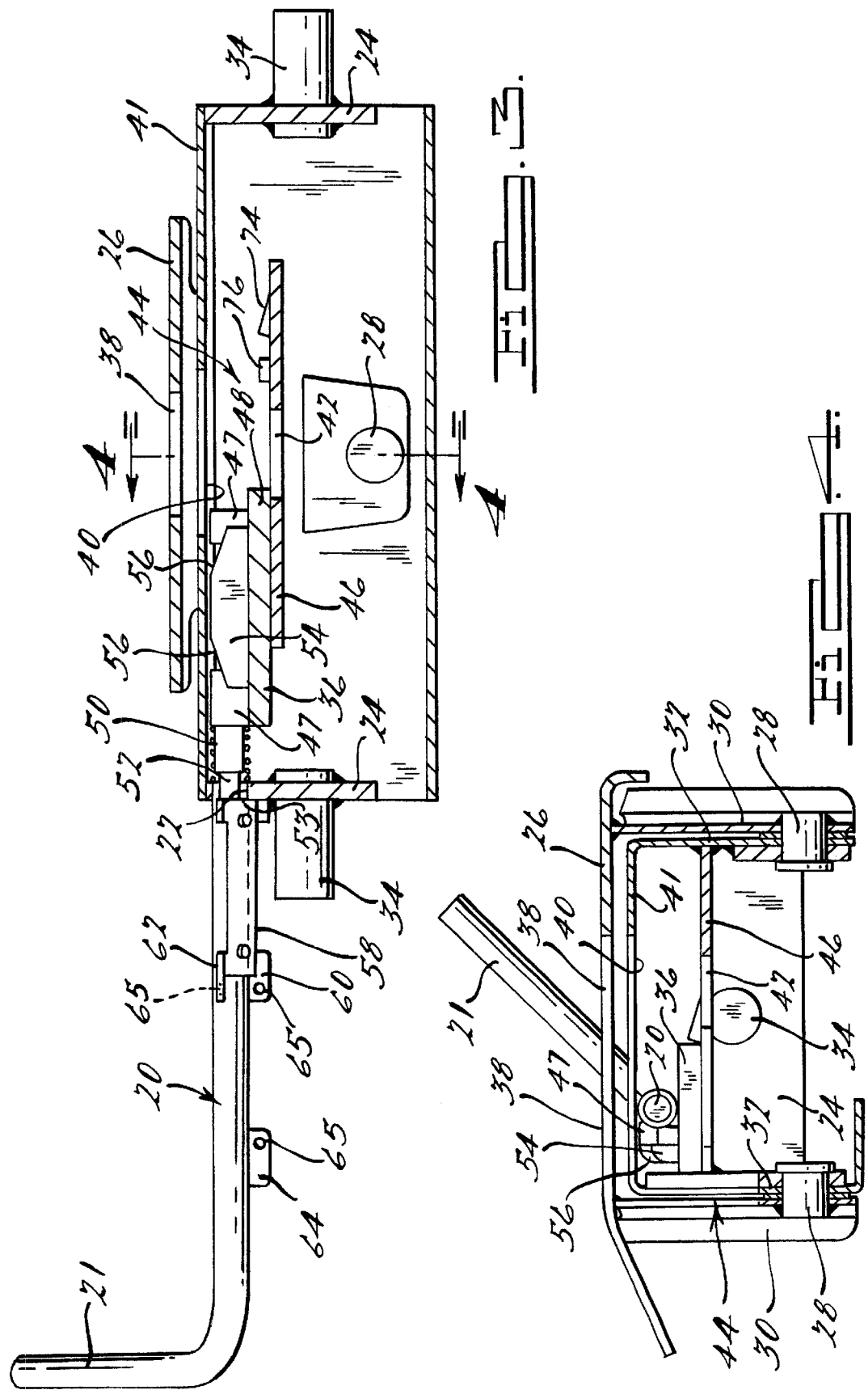

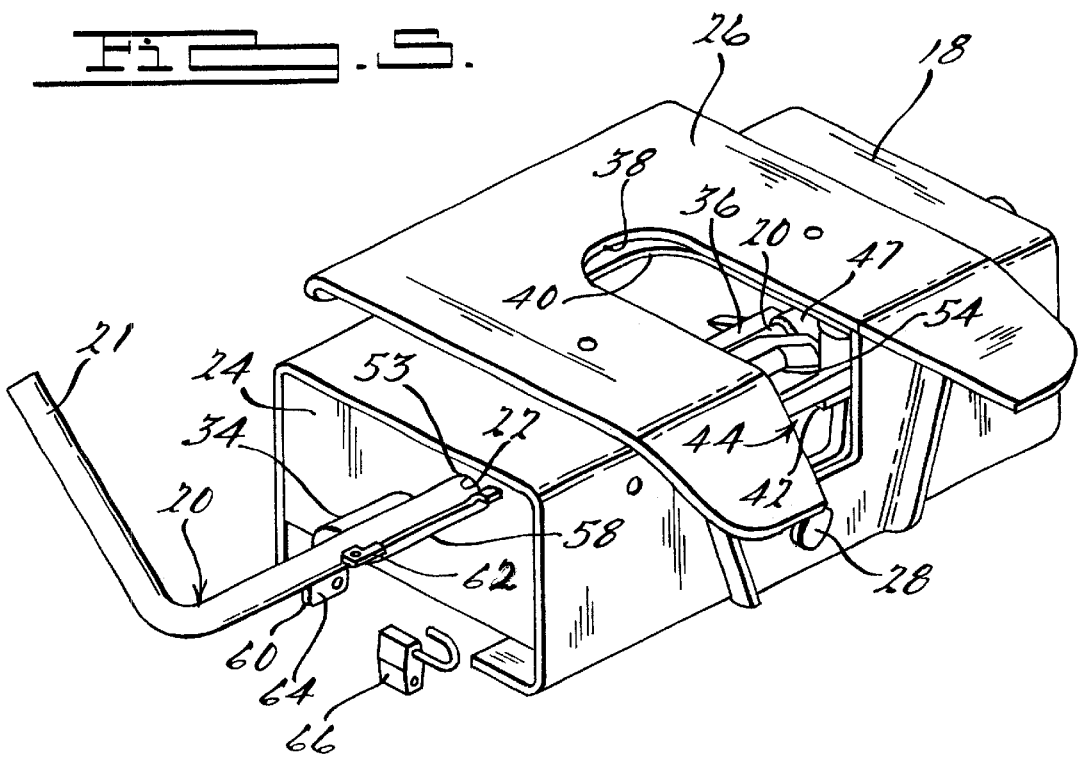
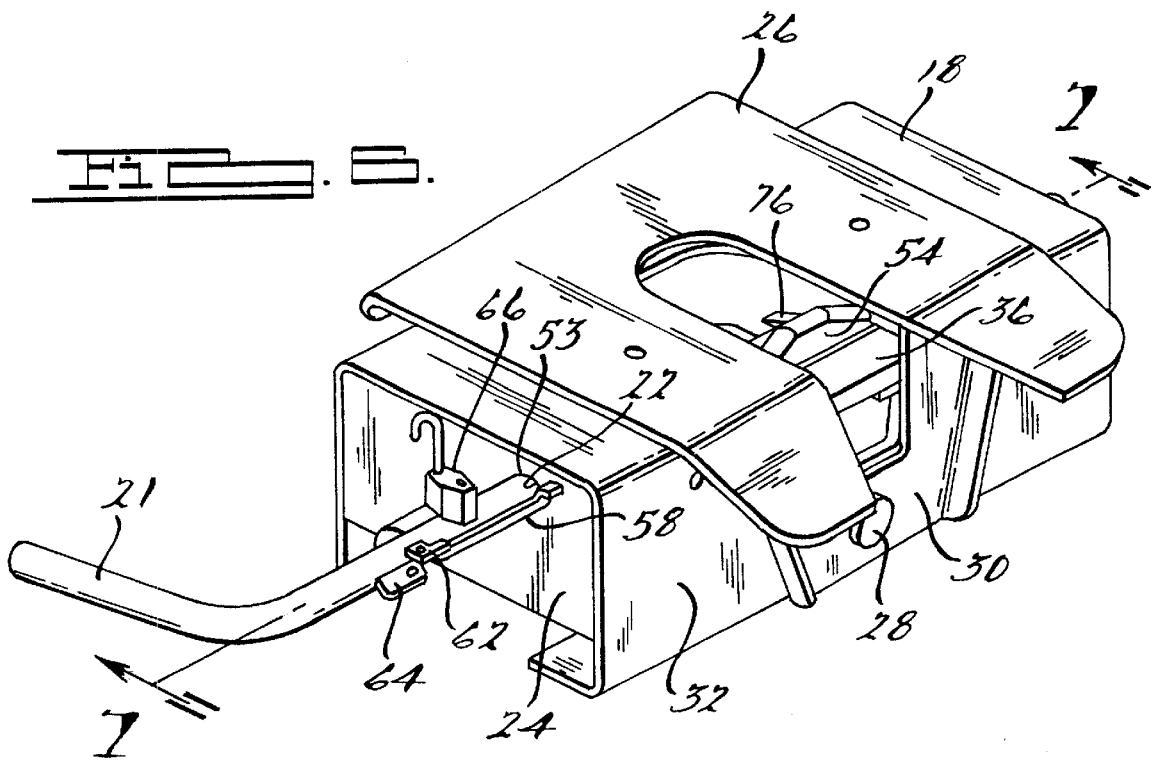

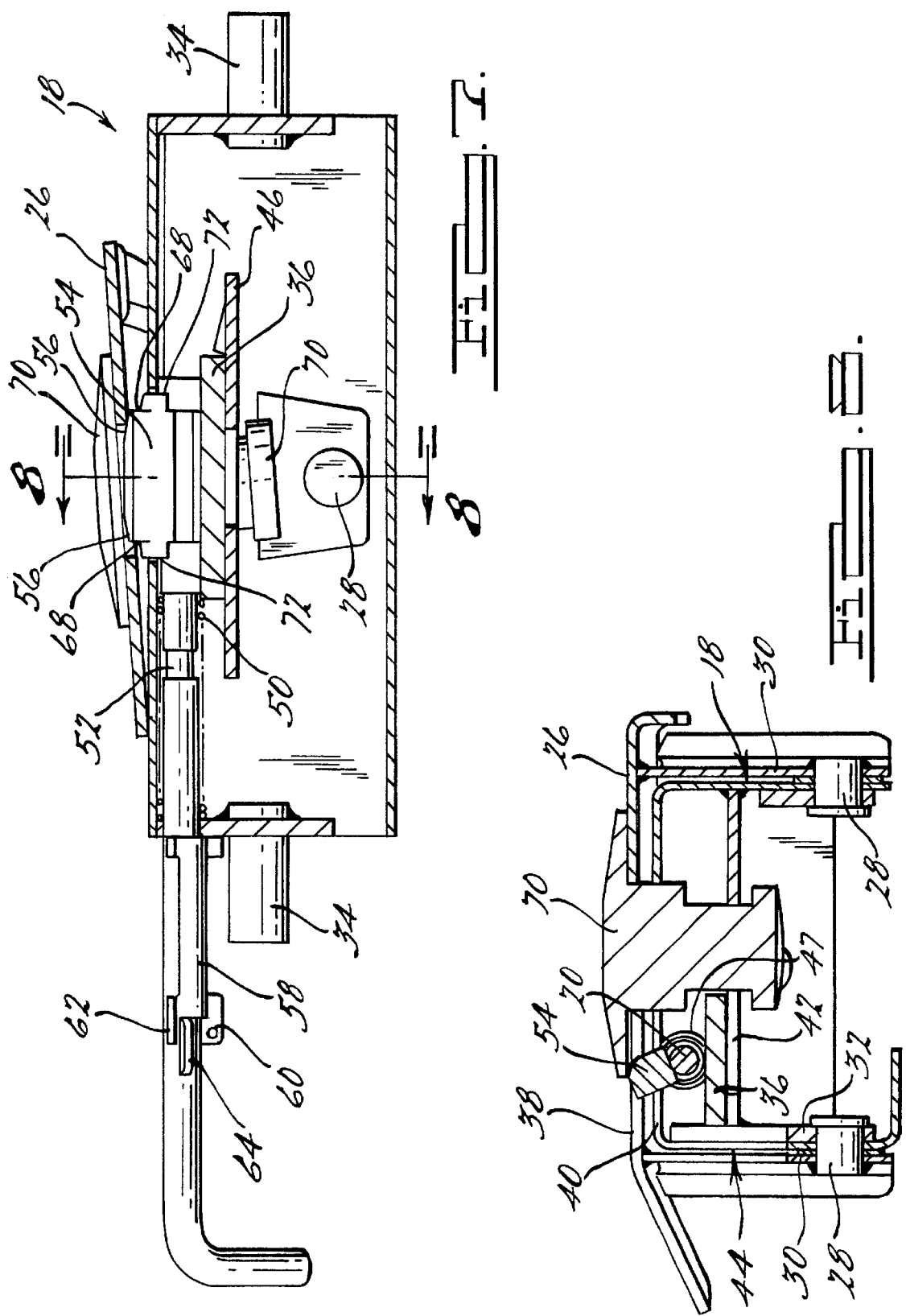

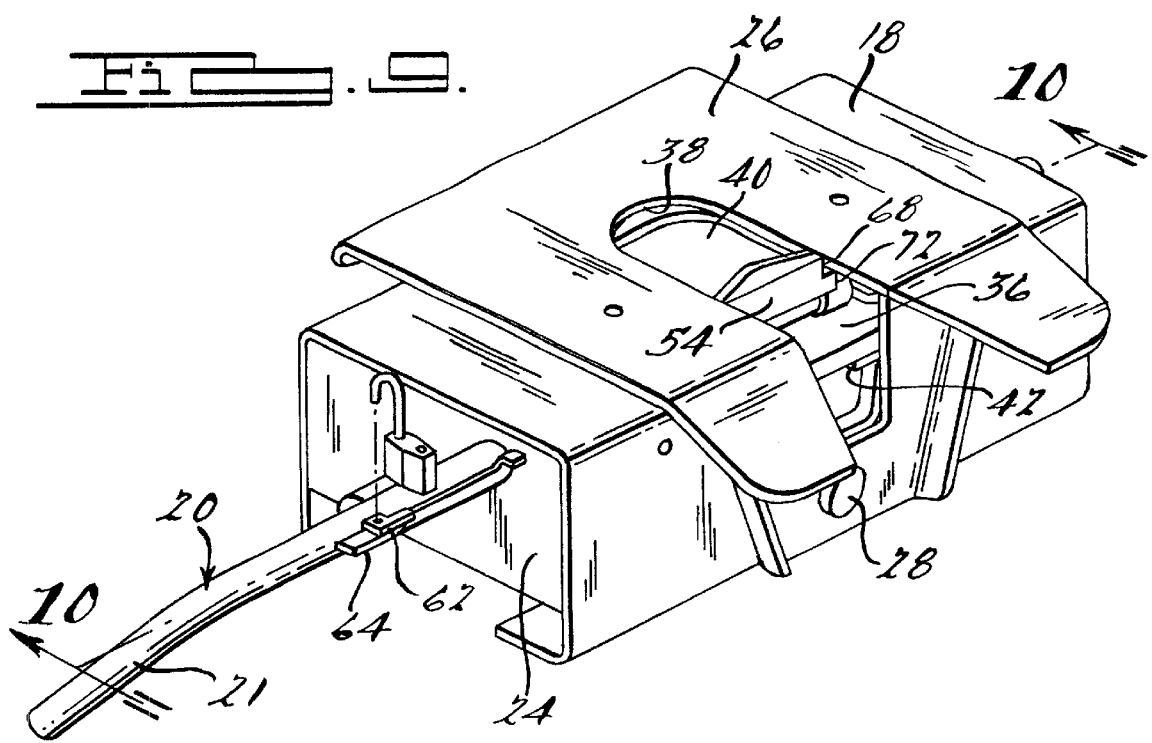

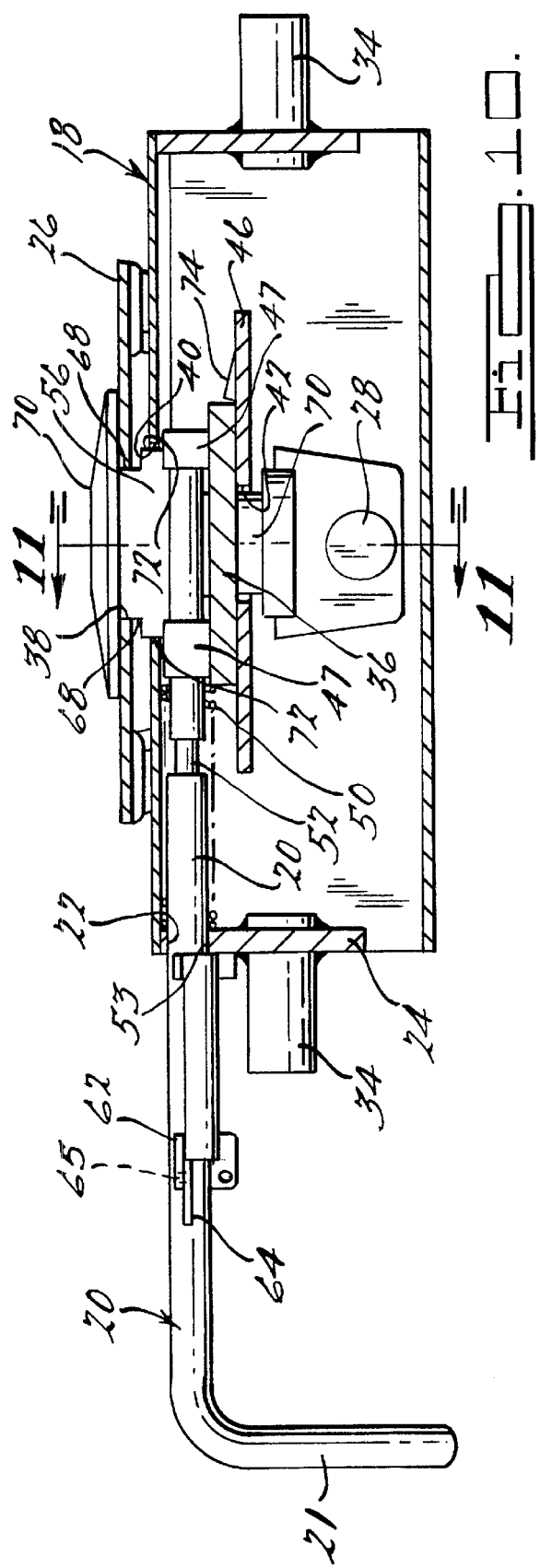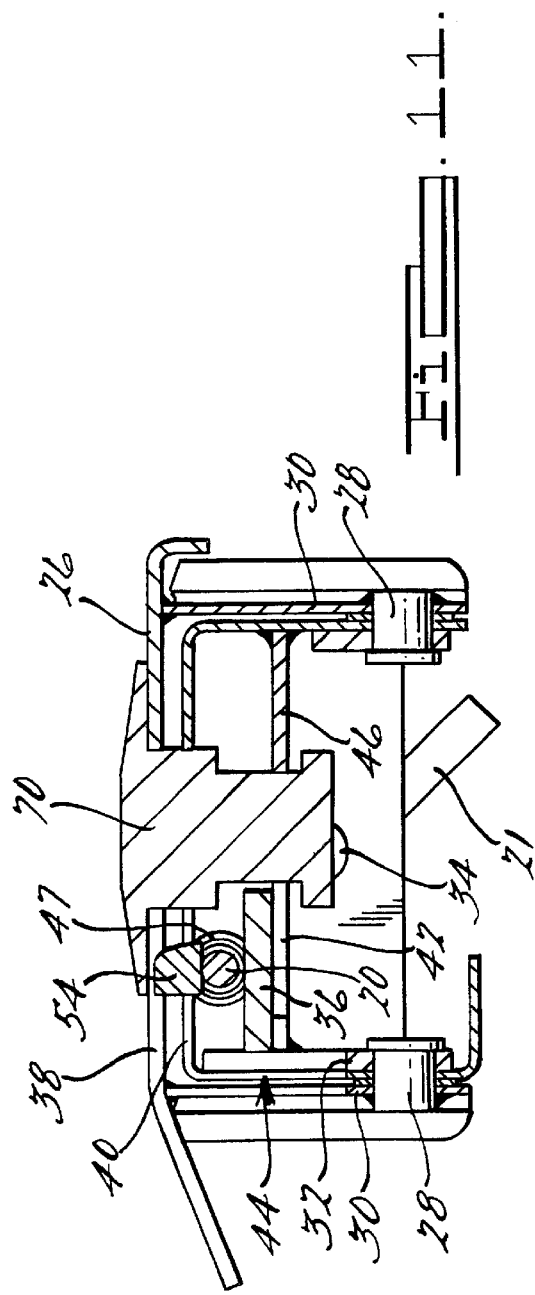

TILTING FIFTH WHEEL TRAILER HITCH

This application is a continuation of U.S. Ser. No. 09/213,136 filed on Dec. 18, 1998 now U.S. Pat. No. 6,170,851 which is a continuing application of provisional application No. 60/068,337, dated Dec. 19, 1997 (now abandoned).

TECHNICAL FIELD

This invention relates to trailer hitches and more particularly to a fifth wheel trailer hitch.

BACKGROUND OF THE INVENTION

Fifth wheel trailer hitches have long been used to tow a fifth wheel trailer. Fifth wheel hitches have been mounted within the cargo area of pick-up trucks. Commonly, the fifth wheel trailer hitch has a skid plate with a slot therein. The slot is open at its rear end to receive a kingpin extending downward from a trailer pin box. A lock mechanism is located under the skid plate and a commonly uses a jaw like device and is located under the skid plate and secures the kingpin in the skid plate slot. The lock mechanism commonly uses a jaw like device and is often controlled by a handle that extends from the side of the hitch box under the skid plate that can be reached from outside of the cargo area.

The fifth wheel hitch is mounted on a truck. In order to mount the trailer, the truck backs up under the trailer such that the kingpin slides laterally into the slot. However, if the trailer is not level, it is often difficult to determine if the kingpin and skid plate are adequately aligned because of the different cants of the kingpin and skid plate. Furthermore, the tilting of the kingpin with respect to the skid plate can cause a rough engagement which may even cause uncomfortable tilting to the truck.

A fifth wheel hitch that tilts its skid plate to accommodate a smooth engagement between the truck and the trailer has been developed. Some skid plates do not have a mechanism to affix the skid plate after engagement has been made. Affixation of the skid plate with respect to the rest of the housing and the truck may be desirable during towing to reduce side to side rocking of the trailer pin box on the fifth wheel hitch. Other skid plates do have the option to be positively locked out to prevent further side to side rocking motion. However, the anti-rock lockout mechanisms devised to achieve these purposes have been relatively complex and add to the expense of the fifth wheel hitch. Furthermore, these anti-rock lockout mechanisms are controlled by an inconveniently positioned lever which must be actuated from within the cargo area.

What is needed is a fifth wheel that has a tiltable skid plate that provides a smooth and even engagement of the fifth wheel hitch with the kingpin on the trailer and provides full bearing surface support for the kingpin box. What is further needed is an anti-rock lockout mechanism that may be conveniently selected to automatically engage when the skid plate becomes level. What is further needed is a fifth wheel hitch that can accommodate the tilting skid plate and automatic anti-rock locking mechanism in an expeditiously manufactured construction.

SUMMARY OF THE INVENTION

In accordance with one aspect of the invention, a fifth wheel trailer hitch includes a housing affixably mountable on a truck. The housing has a rearward facing slot. A skid plate is pivotably mounted on the housing and also has a rearward facing longitudinal slot aligned with the slot in the housing for receiving a kingpin of a trailer. The pivotable motion of the skid plate relative to the housing is a transverse pivotable motion for alignment with a trailer kingpin that is canted with respect to the housing. A locking jaw device secures the kingpin in the slot by engagement about a reduced collar section of the kingpin. The locking jaw device is operably connected to a manually operable handle extending from a side of the housing for opening and closing the hitch about the kingpin. Preferably, the locking jaw device is laterally slidable in the housing to move the locking jaw device between the open position misaligned from the slot and the closed position traversing across the slot.

The manually operable handle is spring biased to the closed position and with a hold for holding said handle in the open position. The hold is preferably in the form of a groove on the handle that abuts an edge of an opening functioning as a detent in the housing through which the handle extends from the housing. The detent is disengaged by the abutment of the kingpin to allow the jaw device to biasly move to the closed position automatically upon entry of the kingpin in the slot. The spring is preferably a compression coil spring coaxially mounted about the handle between a housing sidewall and the locking jaw device.

A lockout device is mounted to the housing and is selectively biased for movement in a direction to automatically engage the skid plate when said skid plate is in a level horizontal position. The lockout device affixes the skid plate in the horizontal level position with respect to the housing and prevents further transverse pivotable motion of the skid plate relative to the housing until the hitch is manually reset. The lockout device is selectively set by the same handle that extends laterally out from said housing.

Preferably, the lockout device includes a lock block affixed onto the handle. The block is biased to move in a direction substantially traverse to the traverse tilting motion of the skid plate. Preferably, the aligned opening is the slot in the skid plate that also receives the kingpin. The block moves into the slot to abut opposing side edges of the slot for locking the skid plate in a horizontal position with respect to the housing. It is desirable that the block is eccentrically mounted about a pivot axis and pivotable into the slot. The handle has a crank section that provides a torque force exerted by gravity to pivot the block into the slot of the skid plate when the slot is aligned with the block.

In accordance with another aspect of the invention, a fifth wheel trailer hitch has a housing that is affixably mountable on a truck having a rearward facing slot. A skid plate is mounted on the housing and has a rearward facing longitudinal slot aligned with the slot in the housing for receiving a kingpin of a trailer. The skid plate is pivotably mounted on the housing for traverse pivotable motion relative to the housing for alignment with a trailer kingpin that is canted with respect to the housing. The locking jaw device secures the kingpin in the slot. The locking jaw device is operably connected to a manually operable handle extending from the housing for opening and closing the hitch about the kingpin. A lockout device is mounted to the housing and is selectively biased for movement in a direction to automatically engage the skid plate when the skid plate is in a level horizontal position. The lockout device affixes the skid plate in the horizontal level position with respect to the housing and prevents further transverse pivotable motion of the skid plate relative to the housing until the hitch is manually reset. The lockout device is biased to move in a direction substantially traverse to the traverse tilting motion of the skid plate.

In accordance with another aspect of the invention, a fifth wheel trailer hitch has its handle operably connected to the locking jaw device to slide it between the open position misaligned from the slot and the closed position where it traverses across the slot. The manually operable handle is spring biased to the closed position. A groove in the handle can engage with a wall edge about an opening in the housing from which the handle extends to form a detent for holding the handle in the open position. The jaw device extends into the slot to be knocked by the kingpin when it enters the slot to disengage the groove from the wall edge to allow the spring bias to move the jaw device to the closed position. As the kingpin moves by the jaw device into the slot, the jaw device moves behind the kingpin across the slot and locks the kingpin in the slot.

In this fashion, a tiltable skid plate has an expeditiously constructed lock-out device that is conveniently reached from outside the cargo area of a pickup truck to optionally and automatically lock out further side-to-side rocking of the skid plate after the trailer and hitch have been coupled together. Furthermore, the jaw device has an easily manufactured hold open device that still allows automatic closing of the hitch to the kingpin.

BRIEF DESCRIPTION OF THE DRAWINGS

Reference is now made to the accompanying drawings in which:

FIG. 3 is a cross sectional view of the fifth wheel trailer hitch taken along lines 3—3 shown in FIG. 2;

FIG. 4 is a cross sectional view taken along lines 4—4 shown in FIG. 3;

FIG. 5 is a view similar to FIG. 2 with the hitch in the closed position and with the automatic lockout device selected in the inactive mode;

FIG. 6 is a view similar to FIG. 5 with the lockout device selected in the automatic engaging mode;

FIG. 7 is a cross sectional view taken along lines 7—7 shown in FIG. 6 with the kingpin shown in the slot in a canted position along with the skid plate in a correspondingly canted position;

FIG. 8 is a cross sectional view taken along lines 8—8 shown in FIG. 7;

FIG. 9 is a view similar to FIG. 5 with the lockout device in the engaged position;

FIG. 10 is a cross sectional view taken along lines 10—10 shown in FIG. 9 with the kingpin shown in the slot in a level position along with the skid plate in a correspondingly level position; and FIG. 11 is a cross sectional view taken along lines 11—11 shown in FIG. 10.

DETAILED DESCRIPTION OF THE PREFERRED EMBODIMENT

Figure 1:
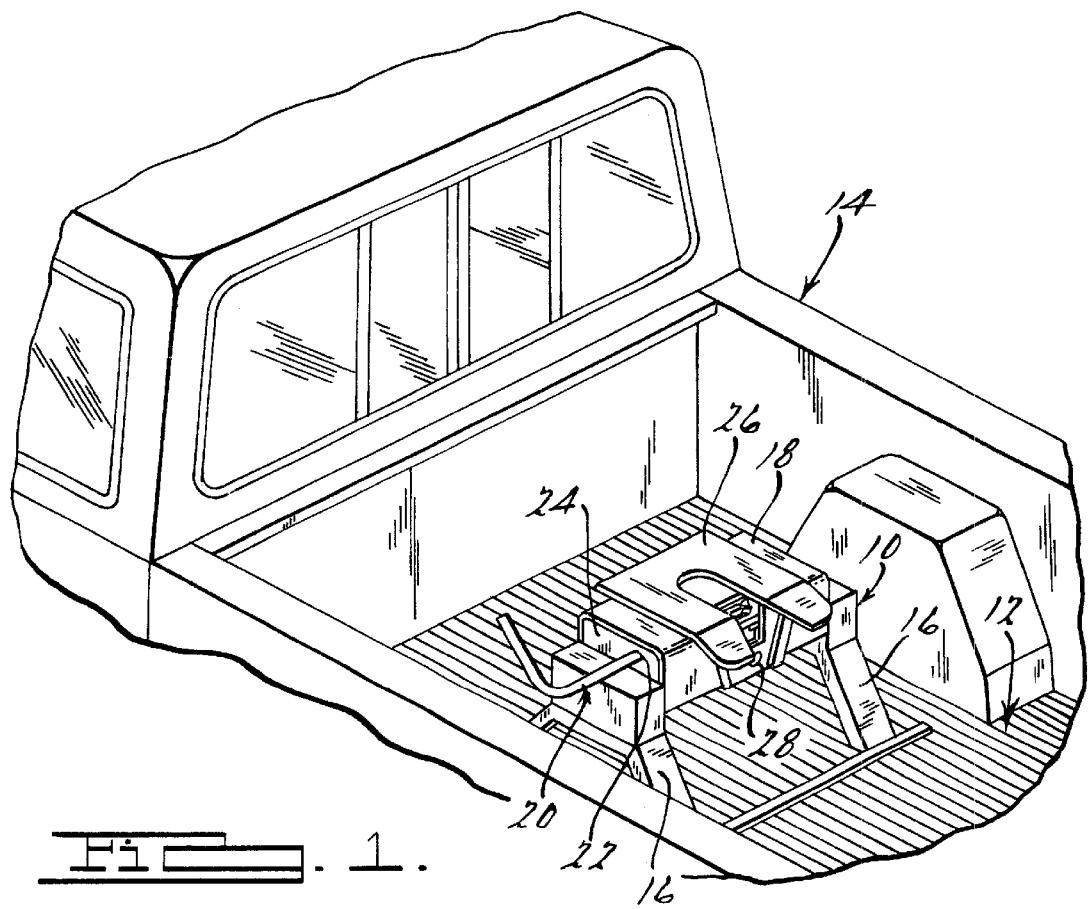
FIG. 1 is a perspective view of a fifth wheel trailer hitch in accordance with one embodiment of the invention shown mounted in a cargo area of a pickup truck.

Reference now is made to FIG. 1 where a fifth wheel trailer hitch 10 is shown mounted to a cargo area 12 of a pickup truck 14. The fifth wheel trail hitch 10 has a conventional base stand 16 that includes mounting rails that are directly mounted to the floor of cargo area 12 in a manner well known in the art. A housing 18 is mounted to the base stand 16. The housing has a manual operating handle 20 that extends out of an opening 22 in a side wall 24 of the housing.

Figure 2:
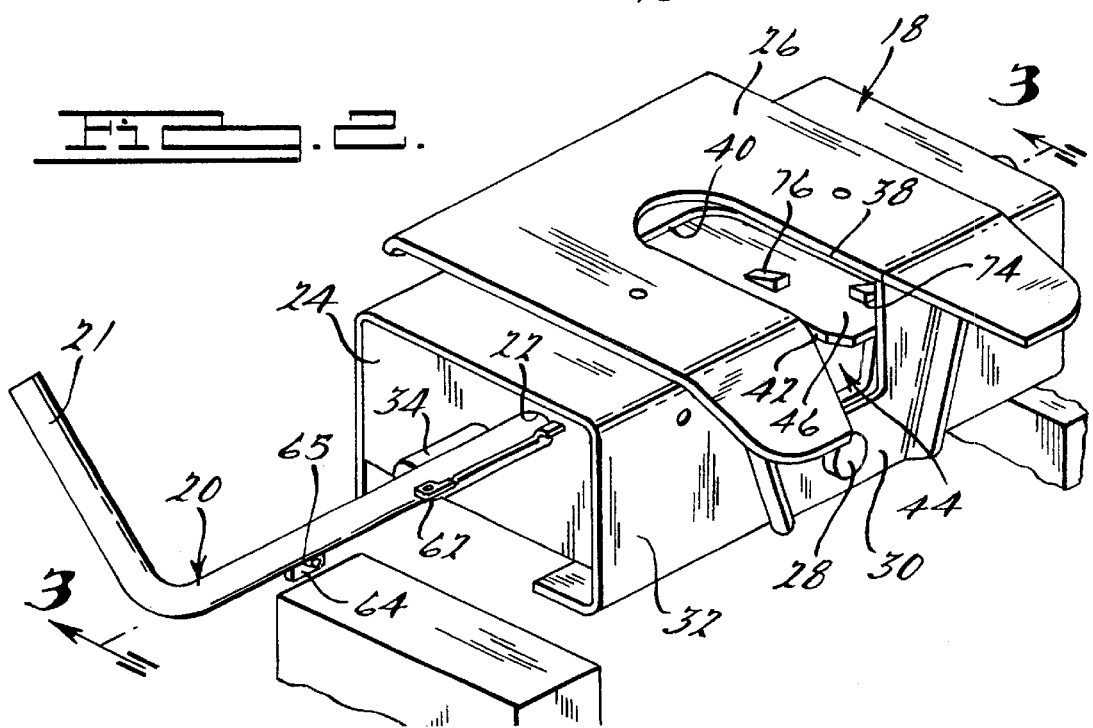
FIG. 2 is an enlarged perspective view of the fifth wheel trailer hitch shown in FIG. 1 with the hitch in the open position.

As more clearly shown in FIGS. 2 and 4, a skid plate 26 is pivotably mounted for limited pivotable movement on the housing through pivot pins 28 that mount front and back flanges 30 of the skid plate 26 to respective front and back walls 32 of the housing. The axis of pivoting follows the longitudinal axis of the pick up truck. The direction of tilting is traverse to the axis in a side to side direction relative to the housing and pick up truck. Limited fore and aft pivoting is accomplished by the housing being pivotably mounted on pins 34 for pivoting about a transverse axis through the pins 34. The specific construction of fifth wheels with both fore and aft pivotal motion and side to side pivotal motion is well known in the art.

Now looking at FIGS. 2 and 3, the handle 20 is pulled out to place the hitch i n a n open position to either engage or disengage a kingpin (shown later) that is mounted to a kingpin box of a trailer (not shown). The handle has a distal crank section 21 that is orthogonal to the main handle section and extends therefrom. The crank section 21 is used to both pull and rotated the handle as described below. The handle 20 when pulled out from the housing 18 to the position shown in FIG. 3 pulls a slidably movable jaw plate 36 to an open position to be misalign from slot 38 in skid plate 26, the slot 40 in the top wall 41 of the housing and a slot 42 in a jaw support plate 46 affixed inside the housing. When in this position, the kingpin is free to be laterally moved in and out of the aligned slots 38, 40 and 42, (commonly referred to as the throat 44 of the hitch.). The jaw has two engagement loops 47 which are receiving the handle 20 for pivotable movement but translationally and laterally lock the jaw plate 36 with the handle 20. A coil spring 50 is interposed about the handle between the side wall 24 and the engagement loop 47 to bias the handle to the closed position as shown later. The handle 20 can retain itself in the open position shown in FIG. 3 by being laterally movable such that two abutting shoulders in the form of an annular groove 52 and edge 53 of wall 24 about the opening 22 function as a detent. The end 48 of jaw plate 36 slightly protrudes over the slot 42 in the jaw support plate 46 to be abutted and displaced by the kingpin as the kingpin enters the throat 44 to disengage the detent 53 to allow the handle to resiliently move to the closed position and positioned directly under slots 38 and 40. When in the closed position, the stops 74 and 76 abut against jawplate 36.

A locking device in the form of a lock block 54 is securely affixed to the handle 20 by either being welded thereon or bolted. The lock block 54 extends radially from the handle 20 as more clearly shown in FIG. 4. The lock block has tapered corners 56 to accommodate the tilting of the skid plate when the lock block is rotated to a set position as described below. A sleeve 58 extends outwardly from side wall 24 and has two lock tabs 60 and 62 that can selectively lock with complementary lock tab 64 affixed to handle 20. Each lock tab 60, 62 and 64 has a hole 65 therein to receive a pad lock 66.

Reference now is made to FIG. 5 which shows the hitch in the closed position and selected to retain the side to side tilting of the skid plate. The kingpin as it enters the throat displaces the end 48 of the jaw plate 36 which thus displaces and unseats the annular groove 52 from the detent edge 53 and allows the spring 50 to bias the jaw plate 36 to the closed position. In the mean time, the skid plate 26 is free to tilt to match the cant or angle at which the kingpin and kingpin box is being received. The jaw plate 36 of course is held open by the kingpin until the kingpin passes by the jaw plate 36 and allows the jaw plate 36 to pass behind the kingpin to laterally lock it in the hitch. In this fashion, the fifth wheel hitch automatically provides lateral alignment with the kingpin and the fifth wheel trailer kingpin box to provide a smooth and even engagement of the hitch with the kingpin on the trailer. The jaw plate 36 is free to slide to its closed position regardless if the kingpin 70 is straight and the skid plate 26 is level as shown in FIG. 10 or if the kingpin 70 and the skid plate 28 are canted with respect to the housing 18 as shown in FIG. 7.

If the operator desires the side to side tilt feature of the skid plate 26 during towing, he merely retains the crank to point in a generally upward direction as shown in FIG. 5 and places a pad lock 66 through now aligned tabs 60 and 64. The crank section 21 points substantially upward and the lock block 54 points substantially rearward and remains below the skid plate 26 and away from slot 38 such that the skid plate 26 is able to tilt about pins 28. Because the handle 20 laterally extends from the housing 18 and the crank 21 conveniently points upwardly, the operator can reach and operate the crank 21 by merely being at the side of the pick up truck 14 and he does not have to step into the cargo area 12.

Many operators desire to prevent any side to side rocking of the trailer with respect to the hitch. The operator has the option of setting an anti-rock device that locks out the side to side tilting of the skid plate 26 after the trailer is hitched up to the fifth wheel and during towing of the trailer. If he so desires, instead of leaving the crank 21 in the upward pointing direction as shown in FIG. 5, he can rotate the crank 21 to the position shown in FIG. 6. The operator can rotate the crank from the convenience of standing besides the pick up truck 14. When the crank section 21 is in this position, it extends substantially forward and the tab 64 is laterally aligned with tab 62 on sleeve.

If the skid plate is already level with the housing 18 when the kingpin 70 is received in the hitch, as shown in FIGS. 9–11, the crank 21 can be fully rotated to a downward and forward direction. In this position, the tabs 62 and 64 abut against each other and lock pad 66 can be installed in aligned holes 65. Furthermore, the lock block 54 protrudes into slot 38 and has its sides 68 in close proximity to the edge of the skid plate surrounding the slot 38. In addition, the lock block 54 has a stepped section 72 in close proximity to the edges of the housing about slot 40. As such, the side-to-side tilt action i.e. rocking of the skid plate 28 is locked out and the skid plate 26 remains affixed with respect to the housing.

The lock block 54 can still be set to be actuated to move in an automatic fashion to the anti-rock or lock position even if the skid plate 26 remains at a lateral cant with respect to the housing. Referring now, to FIGS. 6, 7 and 8, the operator rotates the crank forwardly such that the crank 21 will be pointed substantially horizontal and forward from the rotational axis of handle 20. The crank 21 is noted to not have turned as far compared to the position shown in FIGS. 9–11 such that the crank 21 will be pointed substantially horizontal and forward from the rational axis of handle 20. Tab 64 is laterally aligned with tab 62. It should be noted that the tab 60 is still spaced from tab 62 to allow for the further rotation of the crank 21. The lock pad 66 may still pass through both holes 65 in the tabs 62 and 64 to lock the handle 20 and jaw plate 36 in the closed position.

The skid plate 26 is still canted with respect to the housing 18 as shown in clearly in FIG. 7. The lock block 54 extends partially upwardly such that its step section 72 is already set in slot 40 in housing. However, the edges 68 are situated below slot 38 and the skid plate 26 is allowed to slide over tapered top edge 56 as it tilts in the traverse direction. The hitch handle 20 and lock block 54 remain in the positions shown in FIGS. 7 and 8 until the skid plate laterally tilts to a level position. When, during the beginning of towing, the skid plate and kingpin moves from its canted position shown in FIGS. 6 and 7 to a level position, as shown in FIGS. 10 and 11, the weight of the crank 21 by laterally extending outward from the axis places a torque on the handle 20 and lock block 54 to automatically rotate the lock block 54 into the slot 38 as shown in FIGS. 9–11 such that the lock block now extends through both slots 38 and 40. The lock block automatically moves into position to lock the skid plate 26 with respect to housing 18 and prevent any further side to side tilting of the skid plate 26 with respect to housing 18.

When the trailer needs to be uncoupled from the hitch, the truck is backed up to relieve frictional stress between the jaw 36 and the kingpin 70. The operator then unlocks and remove pad lock 66, rotates crank 21 to the upward position, and pulls on the crank 21 to pull the handle 20 and jaw plate 36 to the open position. He then seats the groove 52 on detent 53. He can do both actions of unlocking the lock block 54 and opening the jaw plate 36 by using a single handle crank 21 from the convenient location of outside of the cargo area. He then merely drives the truck forwardly away from the trailer.

In this fashion, a expeditiously manufactured fifth wheel hitch provides for an efficient closing jaw plate, a skid plate that laterally tilts with respect to the housing to provide for smooth and even engagement of the hitch to the trailer kingpin, the option of locking out the side to side tilting of the skid plate during towing, and for easy operation of a single handle for closing, setting and opening the hitch.

Other variations and modifications are possible without departing from the scope and spirit of the present invention as defined by the appended claims.

What is claimed is:

1. A fifth wheel trailer hitch characterized by:
   a housing affixably mountable on a truck having a rearward facing slot;
   a skid plate having a rearward facing longitudinal slot aligned with the slot in the housing such that a kingpin of a trailer can be received in both slots;
   said skid plate being pivotably mounted on said housing for transverse pivotable motion relative to said housing for alignment with a trailer kingpin that is canted with respect to the housing;
   a locking jaw device mounted to said housing movable from an open position to a closed position for securing said kingpin in said slots;
   said locking jaw device operably connected to a manually operable handle for opening and closing said hitch about said kingpin;
   a lock-out device mounted to said housing and being moveable between a stored position in said housing under said slot in said housing and a lockout position extending through both slots in said skid plate and said housing for preventing further transverse pivotable motion of said skid plate relative to said housing.

2. A fifth wheel trailer hitch characterized by:
   a skid plate having a rearwardly facing longitudinal slot for receiving a kingpin of a trailer;
   a housing affixably mountable on a truck and pivotably mounting said skid plate for transverse pivotable motion of said skid plate relative to said housing for alignment with a trailer kingpin that is canted with respect to said housing;

a locking jaw device operably mounted on said housing for movement between an open position and a closed position for securing said kingpin in said slot;

said locking jaw device operably mounted to a manually operable handle that extends from said housing; and a lockout device mounted on said locking jaw device to be engageable with the skid plate when the skid plate is in a horizontal level position and for affixing said skid plate in the horizontal level position with respect to said housing and preventing further transverse pivotal motion of said skid plate relative to said housing.

3. A fifth wheel trailer hitch as defined in claim 2 further characterized by:

said lockout device being a block receivable in said slot in said skid plate to abut opposing side edges of said slot for locking said skid plate in a horizontal position with respect to said housing.

4. A fifth wheel trailer hitch as defined in claim 3 further characterized by:

said block being eccentrically mounted about a pivot axis and pivotably movable into said slot.

5. A fifth wheel trailer hitch as defined in claim 4 further characterized by:

said housing having a rearward facing slot aligned under the slot in said skid plate.

said locking jaw device mounted to be operably positioned under said slot in said housing with said block extendable through both slots in said housing and said skid plate.

6. A fifth wheel trailer hitch as defined in claim 2 further characterized by:

said lockout device being a block eccentrically mounted about a pivot axis and pivotably movable into said slot.

7. A fifth wheel trailer hitch as defined in claim 2 characterized by:

said housing having a rearwardly facing slot aligned under said slot in said skid plate;

said lockout device mounted to said housing under said slot in said housing and extendable through said sot to engage said skid plate to prevent further transverse pivotal motion of said skid plate.

8. A fifth wheel trailer hitch having a housing affixably mountable on a truck, a skid plate pivotably mounted to said housing and having a rearward facing longitudinal slot for receiving a kingpin of a trailer; a lock jaw device for securing said kingpin in said slot; and said locking jaw device operably connected to a manually operable handle for opening and closing said hitch about said kingpin; the fifth wheel trailer hitch characterized by:

said handle being slidably mounted onto said housing and being operably connected to said locking jaw device to slidably move said jaw device between said open position misaligned form said slot and a closed position to retain said kingpin in said slot;

said handle being spring biased to the closed position, said handle and said housing having complementary abutting shoulders for holding said handle in the open position;

said jaw device having a distal end to be knocked by said kingpin when it enters said slot to disengage said abutting shoulders to allow said spring bias to move said jaw device to the closed position as said kingpin moves by said jaw device into said slot to move said jaw device behind said kingpin to retain said kingpin in said slot;

said skid plate being pivotably mounted on said housing for transverse pivotable motion relative to said housing for alignment with a trailer kingpin that is canted with respect to the housing;

said housing having a rearward facing slot aligned under the slot in said skid plate; and said locking jaw device positioned to slidably move under said slots of both said housing and skid plate.

9. A fifth wheel as defined in claim 8 further characterized by:

said housing having a rearward facing slot aligned under the slot in said skid plate;

said locking jaw device position to slidably move under said slots of both said housing and skid plate.

\* \* \* \* \*